Dec. 24, 1957   A. P. DAVIS   2,817,239
GYROSCOPIC APPARATUS
Filed Aug. 12, 1936   2 Sheets-Sheet 1
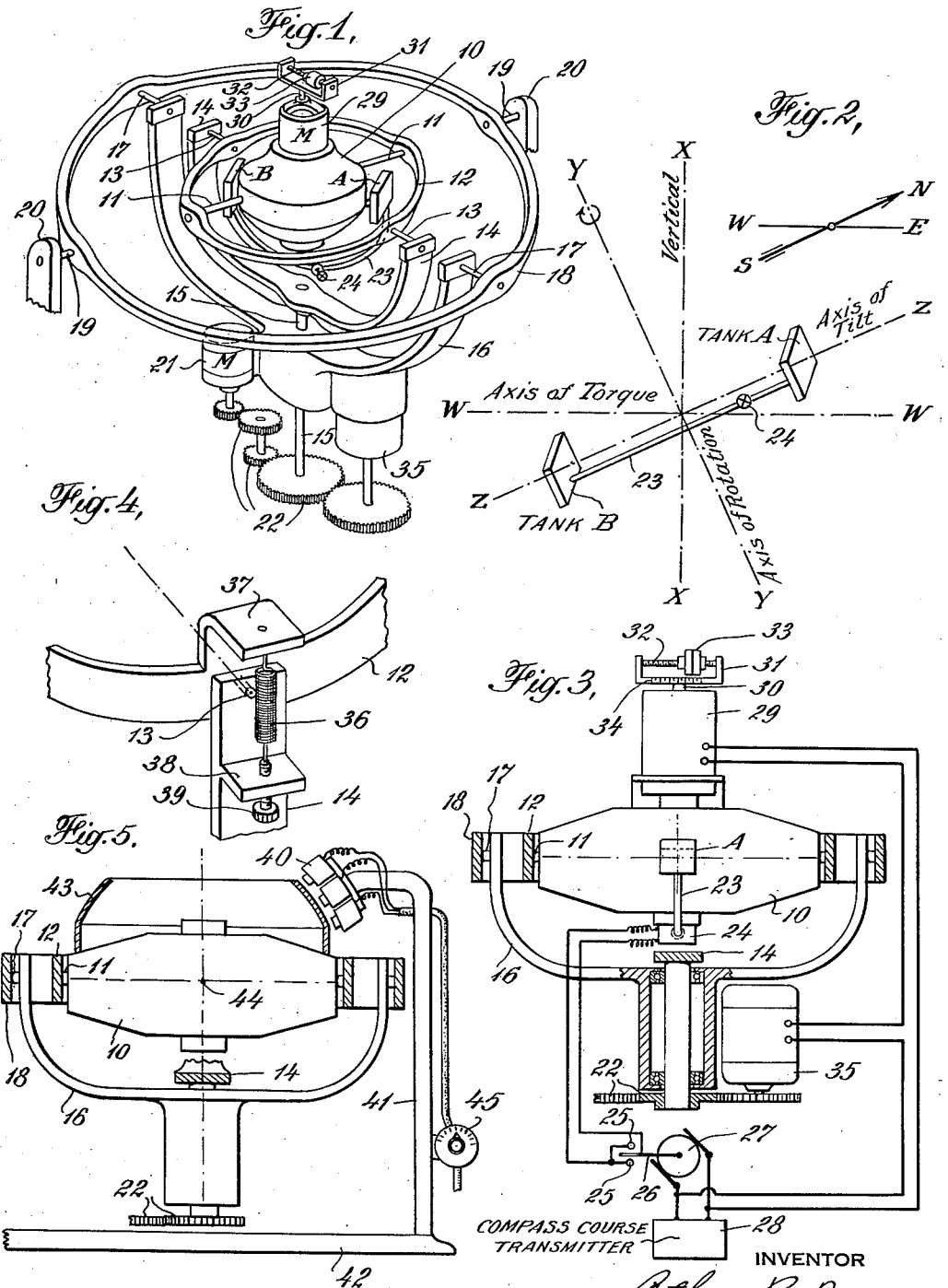
INVENTOR
Arthur P. Davis
BY
ATTORNEYS

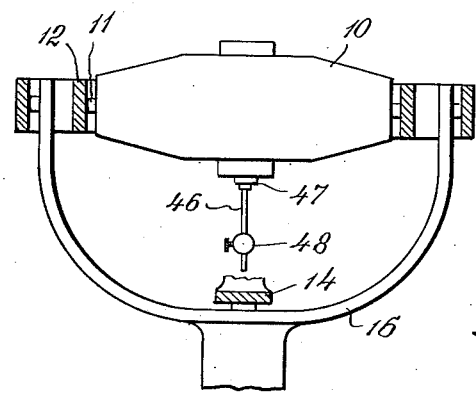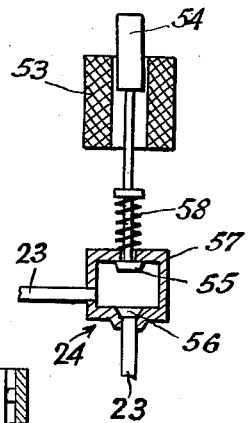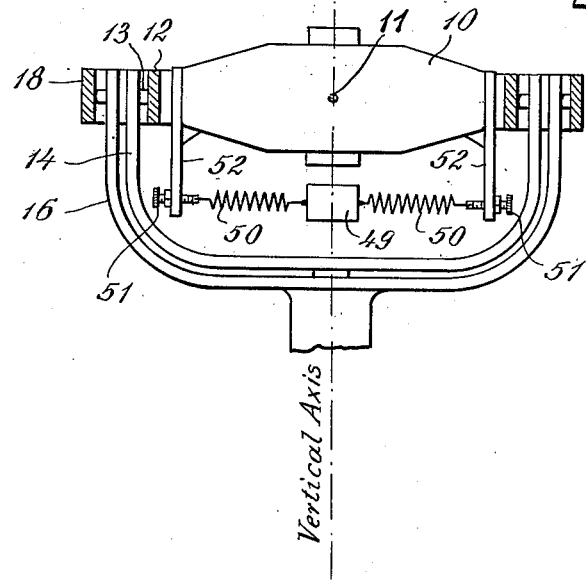

United States Patent Office 2,817,239
Patented Dec. 24, 1957

2,817,239

GYROSCOPIC APPARATUS

Arthur P. Davis, New York, N. Y., assignor to American Bosch Arma Corporation

Application August 12, 1936, Serial No. 95,722

22 Claims. (Cl. 74—5.44)

This invention relates to gyroscopic apparatus, and has particular reference to means for producing and maintaining a level gyroscopic system, including means for righting the gyroscopic system, for correcting for rotation of the earth, and for rendering the system insensitive to certain types of disturbing forces.

Where a non-pendulous gyroscope is mounted on a ship, or other dirigible vehicle, or unstable platform, the roll provides a lateral acceleration of a magnitude dependent upon the period of the roll and the elevation of the gyroscope above the axis of the roll. The magnitude of this acceleration may approach that due to gravity and thus the apparent vertical may be displaced or tilted from the true vertical by a considerable angle. A righting force is necessary to correct for this displacement or tilt. Also, as the earth rotates there is an apparent rotation of the gyroscope to the westward about the north-south axis, requiring a correcting torque applied in such direction and of such magnitude as to cause the gyroscope to precess in the direction of rotation of the earth, in order to maintain the gyroscope axis vertical or perpendicular to the earth's surface. There are other disturbing forces which tend to displace the gyroscope from the vertical and thus require correction or compensation, such as changes in the latitude of the ship, bearing friction in the gyroscope mountings, turning of the ship, and the like.

In accordance with the present invention, a non-pendulous vertical gyroscopic system is provided in which all of the aforementioned disturbing forces, except those due to latitude changes, are automatically substantially corrected or compensated for by bodily rotating the gimbal support for the gyroscope and providing thereon a tuned liquid or other system having the same frequency as the speed of bodily rotation thereof. The correction for changes in latitude is provided by a torque-producing means tending to keep the axis of the gyroscope vertical as the earth rotates.

More particularly, in the gyroscopic apparatus of this invention, the gimbal support for the gyroscope is continuously rotated at relatively low speed in the direction of rotation of the gyroscope about a vertical axis concentric with the settled axis of the gyroscope, the casing of which carries two diametrically opposite mercury tanks connected by a small or otherwise constricted pipe resisting the free flow therethrough. Accordingly, when the gyroscope axis is tilted or displaced from the vertical, the mercury tanks are at different levels and mercury flows from the higher tank through the pipe to the lower tank and the resulting difference of level of the mercury in the opposite tanks sets up a gravity couple which tends to right the gyroscope. However, because the tanks are rotating, their relative levels constantly change, so that the mercury flow is out of phase with the gyroscope tilt by a degree which is a function of the rate of mercury flow between the tanks and is predetermined principally by the degree of resistance to the flow caused by the pipe size or construction. This out-of-phase relation is preferably approximately 90° and since the gravity couple therefore lags the gyroscope by 90°, it is in such direction as to cause the gyroscope to precess toward vertical position by the shortest route. Other similar tuned erecting systems may be provided in accordance with this invention by means of a tuned reed, a rolling weight, a spring-suspended weight, and the like.

The latitude correction device is preferably a weight adjusted relatively to the axis of the gyroscope in accordance with latitude changes, a spring between the inner gimbal ring and its support, an electromagnetic drag device, or the like, each of which imposes a torque on the gyroscope, which causes it to precess toward the vertical to maintain that position.

It will be seen that the gyroscopic apparatus of this invention is a simple and effective means for producing and maintaining a level system under all conditions of normal operation and thus has many uses for navigation, gun fire control, and other purposes.

For a more complete understanding of the invention, reference may be had to the accompanying drawings, in which:

Figure 1 is a perspective view, partially schematic, of the gyroscopic apparatus of this invention;

Fig. 2 is a schematic illustration of the liquid erecting system;

Fig. 3 illustrates the arrangement for gravity correction for latitude changes;

Figs. 4 and 5 illustrate alternative arrangements for correction for latitude changes;

Figs. 6 and 7 illustrate other forms of tuned erecting systems; and

Fig. 8 is an enlarged axial section through one form of automatic cut-out valve for the liquid righting system.

Referring to Fig. 1 of the drawings, numeral 10 designates a gyroscope having its spin axis vertical and pivoted on pins 11 in the inner gimbal ring 12, so as to be non-pendulous. The inner gimbal ring 12 is pivoted on pins 13 arranged at right angles to pins 11 on the supporting fork 14, which is carried by a vertical shaft 15 concentric with the settled vertical axis of the gyroscope 10 and journalled in an outer supporting fork 16 pivoted on pins 17 to the outer gimbal ring 18, in turn pivoted on pins 19, arranged at right angles to pins 17, on a suitable frame 20 secured to the unstable platform such as the deck of a ship or other dirigible craft.

The supporting fork 16 preferably carries the motor 21 connected by gearing 22 to the shaft 15 carrying the gyroscope 10 in the manner described, so that the gyroscope, with its supporting gimbals, is continuously rotated at a relatively slow constant speed, the rate of which is determined by other factors to be described.

Mounted at diametrically opposite points on the gyroscope 10 casing are the tanks A and B connected by a small bore or constricted tube 23. The tanks A and B and the tube 23 contain mercury or other liquid having similar characteristics for the intended purpose. The tanks A and B are arranged at the same level on the gyroscope 10 and thus, when the gyroscope is settled, they both contain the same weight of mercury. Inasmuch as the tanks A and B are mounted on the gyroscope 10 they are rotated with it and its support by the motor 21, and these rotating connected tanks form the liquid erecting system for the gyroscope.

Referring to Fig. 2, which is a schematic illustration of the liquid erecting system in association with the several reference axes, if the axis of rotation Y—Y is truly vertical, i. e., in coincidence with vertical axis X—X, the mercury in tanks A and B holds a fixed level as the tanks rotate and the system is perfectly balanced. If, however, the axis of rotation Y—Y is not truly vertical but tilted as indicated in Fig. 2, then the height of each tank changes as they rotate. Once each revolution one tank is lower than the other, and a half revolution later, higher than the other. Under the pressure of the difference in level in the two tanks, mercury flows from the higher tank, say A, to the lower tank B through the connecting tube 23. The flow depends on several factors, viz. the difference in level or pressure of mercury, and the mass, viscosity, and resistance of the system.

Consider first a resistance controlled system, that is, one in which the velocity of flow is proportional to the pressure. With uniform rotation of the mercury tanks A and B and tilt axis Z—Z, the pressure on the mercury system is a simple harmonic function, expressible by $$P = k \cos(w\ t)$$

where P equals pressure, $k$ is the constant of proportionality, $w$ is the angular velocity or $2\pi$ frequency and $t$ is time. And if V is taken as the volume of mercury that has flowed from one tank to the other in time $t$, R is taken as the resistance to flow of the mercury and C is the constant of proportionality, it may be shown that $$V = \frac{C}{R} \sin(w\ t)$$

which is a simple harmonic function out of phase with P, and lagging by 90 degrees. In other words, as the system rotates, the displacement and resultant unbalance of liquid is a maximum, and the torque due to this unbalance is a maximum, about an axis W—W at right angles to that of the original tilt Z—Z. The magnitude of the unbalance torque is dependent upon V, or inversely, upon R, which is a measure of the energy losses of the system. The righting torque available is thus dependent solely upon the energy loss in the system.

The operation of the liquid erecting system may be described as follows: Consider the stationary system with axis Y—Y coincident with the vertical axis X—X. The level of mercury is the same in both tanks A and B. If the axis of rotation Y—Y is tilted a small angle to vertical X—X and the system started into rotation, the mercury starts to flow from the upper tank to the lower tank. The difference in level of the tanks is a maximum at the start, is gradually reduced as the tanks rotate, becoming zero at 90°, and then increases again, but with the tanks in an opposite relation to each other. Since the flow is resistance controlled, the velocity starts out a maximum, gradually decreasing to zero at 90°, and then reversing. But, while the velocity at the start is maximum, the volume of liquid transferred from one tank to the other, or unbalance in the system, is zero at the start, increasing as the tanks rotate, and becoming a maximum at 90°. Beyond 90°, since the flow of mercury has reversed, the volume displaced decreases and again becomes zero at 180°.

If, at the start, tank A is higher than tank B, then at the 180° later position tank position B is the higher one and the mercury level is again the same in each tank. As rotation continues, mercury continues to flow from tank B to tank A until the 270° position is reached, when the displacement is again a maximum. Beyond 270° the flow again reverses, and at 360° the system returns to the starting condition.

In the half revolution from 270° to 90° mercury flows from tank A to tank B, and between 90° and 270° it flows from tank B to tank A. Thus, in one revolution of the system there is one complete cycle of flow from tank A to tank B and back. There is a maximum displacement of mercury in tank B at 90° and in a tank A at 270°. But tank B at 90° is in the same position as tank A is at 270°, so that their external effects must be the same. Thus the torque of the system is a double frequency harmonic function, and acts externally as a pulsating unidirectional torque. The axis of this torque is the 0°–180° line W—W, which lies in the plane of the original position of the mercury tanks. And since the original tilt of the axis of rotation Y—Y was taken about an axis perpendicular to this plane, it follows that the axis W—W of the erecting torque is perpendicular to the axis of tilt Z—Z.

The liquid system just discussed was considered to be resistance-controlled, but as all liquids have some mass, a large torque and consequently large mass is desirable. It is necessary therefore to compensate for the mass with viscosity, or, to provide a tuned system, i. e., one in which the natural period of oscillation of the liquid is the same as the rotational period. For such a system the amplitude of oscillation under a periodic impressed force of the same frequency builds up to a maximum, limited only by the losses. Thus, by the use of a tuned system two things are accomplished, viz., the flow is made resistance controlled, and the sensitivity may be increased by reducing the losses of the system.

In the system described above it was shown that when the axis of rotation is tilted out of the vertical, gravitational forces acting on the movable masses produce a torque about an axis W—W at right angles to the axis of tilt Z—Z. For a clockwise rotation, as viewed from above, and with a tilt toward the east, this type of erecting system would provide a torque about an east-west axis, directed downward on the south side.

A neutral rotating gyroscope responds to a torque trying to change its axis of rotation, not in the direction of the torque, but about an axis at right angles to the axis of the torque. Thus a gyroscope rotating in a clockwise direction as viewed from above, about a vertical axis and subjected to a torque about an east-west axis directed downward on the north side, will tilt toward the east. And conversely, a torque about an east-west axis, directed downward on the south side, will correct this tilt and precess the gyro toward the vertical. However, the new erecting system provides just such a torque. Accordingly, if the direction of rotation of the erecting system is the same as that of the gyroscope, then the tuned system acts to correct the tilt and to precess the gyroscope toward the vertical by the shortest possible route. A non-resonant system, on the contrary, will increase the time of erection into the vertical and cause the axis of the gyroscope to trace a spiral in the course of erection.

The rate of precession of a gyroscope is directly proportional to the magnitude of the torque applied, which, in the case of the erecting torque obtained from a tuned rotated system, such as described, depends only upon the losses in the tuned system, and these losses may be made as low as desired. However, a system of strong erecting torque is not entirely desirable because it responds too readily to acceleration forces. On board ship, the roll of the ship provides a lateral acceleration of a magnitude dependent upon the period of roll and the height of the instrument above the axis of roll. The magnitude of this acceleration may approach that due to gravity, and thus the apparent vertical may be displaced from the true vertical by a considerable angle. A neutral rotating gyro provided with a liquid erecting system and actually in the vertical will, due to the apparent displacement of the vertical, be acted upon by a torque and precess first in one direction and then in the reverse as the ship rolls one direction or the other. This precessional oscillation causes an error in the gyroscope, which may be minimized by reducing the erecting torque. But since this also reduces the rate of erection, and the accuracy of the final settling, a compromise must be reached between the two. Thus, for small angular deviations from the vertical, a large erecting torque, and consequently low loss system, is desired. On the other hand, for large angular deviations, real or apparent, a system with high frictional losses is needed. A non-linear control of the proper characteristic would accommodate both requirements, and would include a mercury system constructed with orifices and baffles such that for low pressure heads the flow is streamline, and thus of low loss, while for large displacements and operating heads the flow is turbulent and of high loss. The erecting torque would not increase linearly with angular tilt, but would be proportionately greatest for small angles. Equivalent non-linear mechanical systems, which will reduce the error under high periodic acceleration forces may be provided.

The gyroscope, its gimbals and the liquid erecting system are rotated as a unit at the natural frequency of the tuned system. This rate of rotation accordingly depends upon the design of the erecting system, and has been set as low as 15 revolutions per minute by motor 21, which preferably is a small constant-speed A. C. motor.

While harmonic acceleration forces set up by rolling of the ship cause only small precessional oscillation and are compensated for by the liquid erecting system, there are certain non-periodic unidirectional acceleration forces which cause unidirectional precession of the gyro away from the vertical and which require correction. Such acceleration forces are caused mainly by the turning of the ship and are accommodated by stopping the flow of the mercury from one tank to the other during a major turn by means of the electromagnetically-operated cut-out valve 24 in the connecting tube 23, as indicated in Figs. 1, 2 and 3. One form of this cut-out valve 24 is illustrated in enlarged section in Fig. 8, and comprises the solenoid 53 whose armature 54 carries the valve disc 55, adapted to cooperate with valve seat 56 in valve body 57 and normally urged toward open position by spring 58. The valve body 57 is interposed in pipe 23 connecting mercury tanks A and B. When the solenoid 53 is energized the armature 54 thereof forces the valve disc 55 into its seat 56 to stop the flow of mercury through pipe 23. When the solenoid 53 is deenergized, spring 58 reopens the valve 24. Any other suitable form of valve 24 may be employed. The solenoid 53 of the valve 24 is energized by engagement of either of contacts 25 by a contactor 26 operated by a control cut-out motor 27 located at a remote point, such as on the control panel. This motor 27 is preferably energized by the compass course transmitter 28, both motors being of the self-synchronizing type, so as to engage contacts 26 and 25 to close the valve 24 when the ship's course is changed an amount varying up to 15°, depending upon the initial relative position of the contacts. At the end of the turn, the normal yaw of the ship reopens the contacts 25 and 26 and consequently the valve 24, restoring the control to the liquid righting system.

Owing to the turning of the earth, the direction in space of the vertical at any given point on the earth is continually changing, and since a neutral gyro tends to maintain its plane of rotation fixed in space, it moves out of the vertical as the earth turns, and the erecting system is called upon to precess the gyro toward the east to compensate for the turning of the earth. In this type of erecting system, there must be a displacement from the vertical before an erecting torque is produced to cause precession. Thus, where a constant precession is necessary, there must be a constant displacement from the vertical. For a strong erecting system this displacement will be small, though measurable. The magnitude of this displacement will be constant at any latitude, but it will depend upon the latitude, for the angular precession required varies as the cosine of the latitude. For certain uses of the apparatus this displacement error is small enough to be accepted, but for other uses of the apparatus, even this small error can not be tolerated and it becomes necessary to introduce an adjustable torque which will provide the necessary precession toward the east. This latitude correction torque may be introduced in any one of several ways.

The characteristics of the latitude correction means are that the torque must be adjustable with latitude changes, and must act about an axis correctly oriented at all times. Thus if the gyroscope runs in a clockwise direction, the torque necessary to precess the gyroscope toward the east must be directed downward on the north side about an east-west axis. As shown in Figs. 1 and 3, a motor 29, of the self-synchronizing type, driven from the compass course transmitter 28, is mounted on top of the gyroscope 10 with its rotor axis in line with the gyroscope axis. Mounted on the motor shaft 30 is a small bracket 31, which carries a horizontal threaded rod 32 along which can be screwed a small weight 33. A scale 34 at the side of the bracket and an index line on the weight show the proper setting for a given latitude. The motor 29 is driven from the compass course transmitter 28 through the electrical differential motor 35, of the self-synchronizing type, carried by the outer fork 16 and geared to the gimbal rotating shaft 15 so as to compensate for the rotation of the inner gimbal system. Thus the screw 32 is held continuously in a north-south line and the weight 33 exerts the constant torque requisite to secure correctional precession of the gyroscope in accordance with latitude.

In gyroscopic instruments of the type that change their orientation but little during an operating period simpler means for latitude correction may be used. With the double gimbal system of construction described, where the inner gimbals are carried by the rotating fork 14, the axis of rotation of the latter is normally vertical due to its suspension in the outer gimbal system. In the arrangement shown in Fig. 4, the inner gimbal ring 12 is connected to the fork 14 by a vertical helical spring 36, one end of which is tied rigidly to the bracket 37 on the ring 12 above one bearing pin 13, and the other end is attached rigidly to a bracket 38 on the fork 14 directly below the bearing pin 13.

In operation, when the plane of the gimbal ring 12 is normal to the axis 15 of the fork 14, the spring 36 pulls directly across the center line of the bearing pin 13, but if the gimbal ring plane is not normal to axis 15, then the line of action of the spring 36 is no longer in line with the bearing pin 13 axis and it exerts a torque on the ring 12 tending to turn it into line with the axis 15 of the fork 14. It is plain that when the gyroscope 10 is vertical, or nearly so, and the axis 15 of the fork 14 vertical as it hangs freely, the spring 36 has no effect on the gyroscope. However, if the axis of the rotating fork is thrown out of the vertical, then, because the gyroscope axis is vertical, the latitude spring 36 comes into action and exerts a torque on the inner gimbal ring 12, and consequently on the gyroscope 10. The direction of this torque bears a definite relation to the direction of tilt of the rotating fork, and so by properly orienting the outer gimbal system, such as by means of a graduated azimuth ring, not shown, on the base of the instrument, a torque of the proper direction is automatically exerted on the gyroscope. The magnitude of this torque can be adjusted by means of the spring, either by change in spring constant, or a change in the initial tension of the spring by means of screw 39, or by the tilt of the gimbal system with a movable weight. During one half revolution of the system, the torque acts on one side of the gimbal ring, and during the other half revolution, on the other side of the ring, though in the same direction on the gyroscope. The result is a pulsating unidirectional torque on the gyroscope which provides the desired latitude correctional precession. If desired, a leaf spring rather than a helical spring may be used, offering lateral rather than longitudinal restraint.

Fig. 5 illustrates another type of coupling that can be used to transmit a torque from the outer gimbal system to the rotating inner system in order to correct for latitude changes. This form is one in which a polyphase magnetic structure 40 is supported by bracket 41 on an adjustable azimuth ring 42 on the outer gimbal system, with pole faces toward and adjacent to a section of a spherical shell of copper 43 mounted on the gyroscope 10 casing with the center of the sphere surface thereof at the intersection of the three axes of rotation of the gyroscope, namely, at 44. The direction of motion of the magnetic field resulting from the polyphase excitation must be such that the torque applied to the inner system, due to eddy currents induced in the copper of shell 42, is in the proper direction to precess the gyroscope 10. Adjustment for latitude can be made by means of the voltage applied to the exciting winding, by means of a suitable controller 45 calibrated according to latitude. The horizontal projection of the three poles of the magnet 40 must be maintained north and south. Similarly, a single phase A. C. field structure may be used with shading coils on the poles.

Other forms of tuned righting systems may be employed with equal facility. For example, a reed may be attached directly to the shaft of the gyroscope and tuned to the frequency of the bodily rotation of the gyroscope. Fig. 6 illustrates one type of reed construction which may be employed, and in which the flat spring 46 is secured coaxially to one end of the rotor shaft 47 of the gyroscope 10 mounted on the gimbal support, which is constantly rotated as in the arrangement of Fig. 1. A weight 48 is securely fixed on the spring 46 near its extremity and is adjustably positioned thereon to make the natural frequency of vibration of the spring 46 equal to the frequency of bodily rotation of the gyroscope 10. This type of mechanical system can be made of high natural frequency, and consequently lends itself to rotation at high speed. Tilting of the gyroscope accordingly causes the weight 48 to move as the spring 46 bends and sets up a righting couple.

Another form of tuned righting system is illustrated in Fig. 7, and includes a weight 49 suspended axially of the gyroscope 10 by lateral coil springs 50 adjustably connected at their ends by screws 51 to brackets 52 fastened to opposite sides of the casing of the gyroscope 10 at points preferably displaced 90° from the pivot 11 thereof. The tension of the springs 50 is so adjusted by screws 51 that the natural frequency of vibration of the weight 49 equals the frequency of bodily rotation of the gyroscope and its gimbal support, as described. The weight 49 must lie so that its center of mass is coincident with the spin axis of the gyroscope when the latter is vertical, so that any tilt of the axis causes the weight to move relatively thereto and set up a righting force similar to that applied by the tuned liquid system of Fig. 1.

Although the tuned liquid erecting system described is preferred, any other suitable type of mechanical oscillating system having similar characteristics may be employed, with or without one of the several forms of latitude correction devices, depending upon requirements. Thus, although mercury is preferred as the mobile mass which shifts its center of gravity to exert a torque as the gyroscope tilts, equivalent mobile masses such as one or more rolling weights in a trough or pipe similar to pipe 23 may provided, as well as arrangements equivalent or similar to the torque-providing means of Figs. 4, 5, 6 and 7. Also, other changes in the apparatus illustrated and described herein lie within the scope of the invention as defined by the appended claims.

I claim:

1. In gyroscopic apparatus, the combination of a gyroscope, a gimbal support therefor, means for constantly rotating said support, and means rotating with the support and responsive to relative tilting of the gyroscope for exerting a gravitational torque on said gyroscope to cause it to precess toward erect position.

2. In gyroscopic apparatus, the combination of a gyroscope, a gimbal support therefor, means for constantly rotating said support, and responsive to relative tilting of the gyroscope for applying a gravitational erecting couple thereto to cause it to precess at the same rate as the rate of rotation of the earth.

3. In gyroscopic apparatus, the combination of a gyroscope, a gimbal support therefor, means for constantly rotating said support, and gravitational means rotating with the support and responsive to relative tilting of the gyroscope by oscillating at a period corresponding to the rate of rotation of said support for applying gravitational erecting couple to the gyroscope.

4. In gyroscopic apparatus, the combination of a gyroscope, a gimbal support therefor, means for constantly rotating said support, and means rotating with the support and movable relatively to the axis of rotation thereof in response to relative tilting of the gyroscope for applying a gravitational erecting couple to the gyroscope.

5. In gyroscopic apparatus, the combination of a gyroscope, gimbal support therefor, means for constantly rotating said support, and weighted means rotating with the support and balanced on opposite sides of the axis of rotation of said support and shiftable relatively thereto in response to tilting of said gyroscope for applying a gravitational erecting couple thereto.

6. In gyroscopic apparatus, the combination of a gyroscope, a gimbal support therefor, means for constantly rotating said support, means rotating with the support and movable relatively to the axis of rotation thereof in response to relative tilting of the gyroscope for applying a gravitational erecting couple thereto, and means regulating the movement of said last-named means in accordance with the rate of rotation of the support.

7. In gyroscopic apparatus, the combination of a gyroscope, a gimbal support therefor, means for constantly rotating said support, in the direction of rotation of the gyroscope wheel, and means rotating with the support and responsive to relative tilting of the gyroscope for exerting a gravitational torque on the gyroscope to cause the gyroscope to precess toward erect position.

8. In gyroscopic apparatus, the combination of a gyroscope, a gimbal support therefor, means for constantly rotating said support, means rotating with the support and responsive to relative tilting of the gyroscope for applying a gravitational erecting couple thereto, and independent means for applying a constant precessing couple to the latter of a magnitude commensurate with the latitude of location of the apparatus.

9. In a gyroscopic apparatus, the combination of a gyroscope having a vertical spin axis, a gimbal support therefor, means for constantly rotating the gimbal support about a vertical axis substantially aligned with the spin axis of the gyroscope, and means carried by the gyroscope and rotating with the support and responsive to tilting of the gyroscope about the vertical for exerting a gravitational erecting torque thereon.

10. In a gyroscopic apparatus, the combination of a gyroscope having a vertical spin axis, a gimbal support therefor, means for constantly rotating the gimbal support about a vertical axis substantially aligned with the spin axis of the gyroscope, and means normally balanced on opposite sides of the vertical axis of the gyroscope when the latter is erect and movable relatively to said axis in response to relative tilting of the gyroscope for exerting a gravitational erecting couple therein, said last-named means being supported on the gyroscope and rotating with the said support.

11. In a gyroscopic apparatus, the combination of a gyroscope having a vertical spin axis, a gimbal support therefor, means for constantly rotating the gimbal support about a vertical axis substantially aligned with the spin axis of the gyroscope, and weighted means normally having its center of gravity in alignment with the vertical axis of the gyroscope when it is erect and shiftable relatively to said vertical axis in response to relative tilting of said gyroscope for exerting a gravitational erecting couple thereon, said last-named means being supported on the gyroscope and rotating with the said support.

12. In a gyroscopic apparatus, the combination of a gyroscope having a vertical spin axis, a gimbal support therefor, means for constantly rotating the gimbal support about a vertical axis substantially aligned with the spin axis of the gyroscope, a container carried by the gyroscope and extending on opposite sides of the spin axis thereof and rotating with the said support, and a mass movable in said container in response to relative tilting of said gyroscope for exerting a gravitational erecting couple thereon.

13. In a gyroscopic apparatus, the combination of a gyroscope having a vertical spin axis, a gimbal support therefor, means for constantly rotating the gimbal support about a vertical axis substantially aligned with the spin axis of the gyroscope, and weighted means carried by the gyroscope for rotation with said support and movable in response to relative tilting of the gyroscope to shift its center of gravity in the direction of the tilt for exerting a gravitational erecting couple on the gyroscope.

14. In a gyroscopic apparatus, the combination of a gyroscope having a vertical spin axis, a gimbal support therefor, means for constantly rotating the gimbal support about a vertical axis substantially aligned with the spin axis of the gyroscope, weighted means carried by the gyroscope for rotation with said support and movable in response to relative tilting of the gyroscope to shift its center of gravity in the direction of the tilt for exerting a gravitational erecting couple on the gyroscope, and means for regulating the oscillation of the center of gravity of the weighted means caused by the rotation of the tilted gyroscope to control the rate of erection of the gyroscope.

15. In a gyroscopic apparatus, the combination of a gyroscope having a vertical spin axis, a gimbal support therefor, means for constantly rotating the gimbal support about a vertical axis substantially aligned with the spin axis of the gyroscope, containers mounted on opposite sides of the gyroscope for rotation therewith as said support rotates, a tube connecting said containers, and liquid in said containers for flowing through said tube in response to relative tilting of said gyroscope for exerting a gravitational erecting couple thereon.

16. In a gyroscopic apparatus, the combination of a gyroscope having a vertical spin axis, a gimbal support therefor, means for constantly rotating the gimbal support about a vertical axis substantially aligned with the spin axis of the gyroscope, containers mounted on opposite sides of the gyroscope for rotation therewith as said support rotates, a tube connecting said containers, mercury in said containers for flowing through said tube in response to relative tilting of said gyroscope for exerting a gravitational erecting couple thereon, and means for regulating the oscillation of the mercury between said containers caused by the rotation of the tilted gyroscope to control the rate of erection thereof.

17. In a gyroscopic apparatus, the combination of a gyroscope having a vertical spin axis, a gimbal support therefor, means for constantly rotating the gimbal support about a vertical axis substantially aligned with the spin axis of the gyroscope, containers mounted on opposite sides of the gyroscope for rotation therewith as said support rotates, a tube connecting said containers, mercury in said containers for flowing through said tube in response to relative tilting of said gyroscope for exerting a gravitational erecting couple thereon, and a constriction in said tube for retarding the flow of mercury therethrough to regulate the oscillation of the mercury between the containers caused by the rotation of the tilted gyroscope to a period proportional to the rate of rotation of the support.

18. In a gyroscopic apparatus, the combination of a gyroscope having a vertical spin axis, a gimbal support therefor, means for constantly rotating the gimbal support about a vertical axis substantially aligned with the spin axis of the gyroscope, containers mounted on opposite sides of the gyroscope for rotation therewith as said support rotates, a tube connecting said containers, mercury in said containers for flowing through said tube in response to relative tilting of said gyroscope for exerting a gravitational erecting couple thereon, and means responsive to a turning movement of predetermined degree of the gyroscope support for stopping the resultant flow of the mercury between said containers.

19. In a gyroscopic apparatus, the combination of a gyroscope having a vertical spin axis, a gimbal support therefor, means for constantly rotating the gimbal support about a vertical axis substantially aligned with the spin axis of the gyroscope, and independent means for applying an erecting torque to the gyroscope of a magnitude commensurate with the latitude of location of the apparatus.

20. In a gyroscopic apparatus, the combination of a gyroscope having a vertical spin axis, a gimbal support therefor, means for constantly rotating the gimbal support about a vertical axis substantially aligned with the spin axis of the gyroscope, independent means for applying an erecting torque to the gyroscope of a magnitude commensurate with the latitude of location of the apparatus, and directional means for orienting the last-named means about the axis of rotation of the support to maintain constant the direction of application of the torque.

21. In a gyroscopic apparatus, the combination of a gyroscope having a vertical spin axis, a gimbal support therefor, means for constantly rotating the gimbal support about a vertical axis substantially aligned with the spin axis of the gyroscope, a guide carried by said gyroscope, a weight shiftable on the guide to either side of the spin axis of the gyroscope in accordance with the latitude of location of the apparatus for exerting a constant gravitational erecting torque on the gyroscope to compensate for the latitude, and directional means for orienting said guide to maintain it on the north-south line.

22. In a gyroscopic apparatus, the combination of a gyroscope having a vertical spin axis, a gimbal support therefor, means for constantly rotating the support about an axis substantially aligned with the spin axis of the gyroscope, a flexible member carried by the gyroscope and extending coaxially therewith, and a weight mounted on the member with its center of mass coaxial with said spin axis and responsive to tilting of the gyroscope by shifting and flexing the member and exerting a gravitational erecting couple on the gyroscope.

References Cited in the file of this patent

UNITED STATES PATENTS

| | | |
|---|---|---|
| 1,308,783 | Gray | July 8, 1919 |
| 1,311,768 | Gray | July 29, 1919 |
| 1,930,096 | Henderson | Oct. 10, 1933 |
| 1,942,470 | Bassett | Jan. 9, 1934 |

FOREIGN PATENTS

| | | |
|---|---|---|
| 13,280 of 1915 | Great Britain | Mar. 13, 1919 |
| 14,032 of 1915 | Great Britain | Mar. 20, 1919 |